United States Patent
Lin

(12) United States Patent (10) Patent No.: US 9,575,509 B2
Lin (45) Date of Patent: Feb. 21, 2017

(54) ELECTRONIC DEVICE WITH STACKABLE MODULES

(71) Applicant: ScienBiZip Consulting (Shen Zhen) Co, Ltd., Shen zhen (CN)

(72) Inventor: Chun-Jen Lin, New Taipei (TW)

(73) Assignee: ScienBiziP Consulting (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 14/824,610

(22) Filed: Aug. 12, 2015

(65) Prior Publication Data

US 2016/0216734 A1 Jul. 28, 2016

(30) Foreign Application Priority Data

Jan. 22, 2015 (CN) .......................... 2015 1 0030458

(51) Int. Cl.
*G06F 1/16* (2006.01)

(52) U.S. Cl.
CPC ............... *G06F 1/1632* (2013.01); *G06F 1/16* (2013.01)

(58) Field of Classification Search
CPC ..... H05K 999/00; H05K 7/023; G06F 1/1632; G06F 1/1616; G06F 1/1656; G06F 1/1635; G06F 1/1626; G06F 1/181; G06F 1/184; G06F 1/1679; G06F 1/16; G06F 1/1601; G06F 2200/1635
USPC .............. 361/679.41, 679.4, 679.55–679.58, 361/679.02
See application file for complete search history.

(56) References Cited

U.S. PATENT DOCUMENTS

2002/0067593 A1* 6/2002 Milan ................. G06F 13/4095
361/679.45
2008/0123669 A1* 5/2008 Oliveti ................. H01R 13/514
370/401

* cited by examiner

*Primary Examiner* — Anthony Haughton
*Assistant Examiner* — Ingrid Wright
(74) *Attorney, Agent, or Firm* — Zhigang Ma

(57) ABSTRACT

An electronic device includes a host module and a first expansion module. The first expansion module has a first wall and a second wall substantially parallel to the first wall. A host connector is located on the second wall. The first expansion module includes a first coupling wall and a first expansion wall substantially parallel to the first coupling wall. A first coupler is located on the first coupling wall. The first expansion module can be stacked on the host module where the first coupling wall contacts the second wall. The first coupler is electrically and detachably coupled to the host connector.

20 Claims, 4 Drawing Sheets

ELECTRONIC DEVICE WITH STACKABLE MODULES

FIELD

The subject matter herein generally relates to electronic devices, and more particularly, to an electronic device with stackable modules.

BACKGROUND

A traditionally electronic device, such as a smart phone, a tablet computer, an all-in-one computer or a server may run slow during long time use. Memories or some functional components in the electronic device may be insufficient to run growing applications.

BRIEF DESCRIPTION OF THE DRAWINGS

Implementations of the present technology will now be described, by way of example only, with reference to the attached figures.

DETAILED DESCRIPTION

Figure 1:
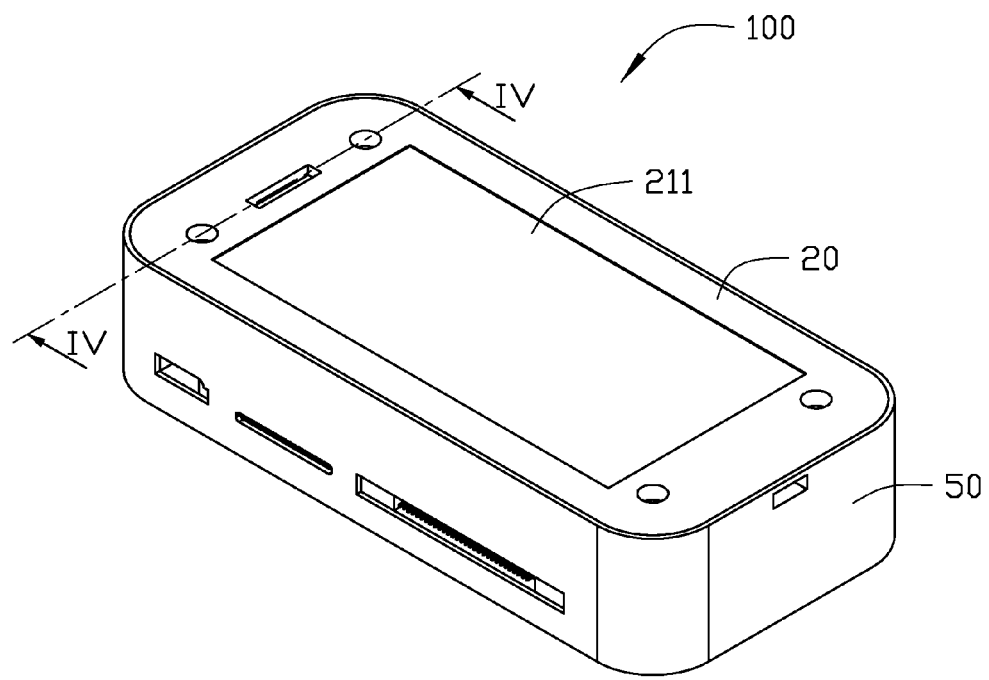
FIG. 1 is an assembled, isometric view of an electronic device in at least one embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series and the like.

FIG. 1 illustrates an assembled view of an electronic device 100 in at least one embodiment. The electronic device 100 can be a laptop computer, a tablet computer, a smart phone, or a server.

Figure 2:
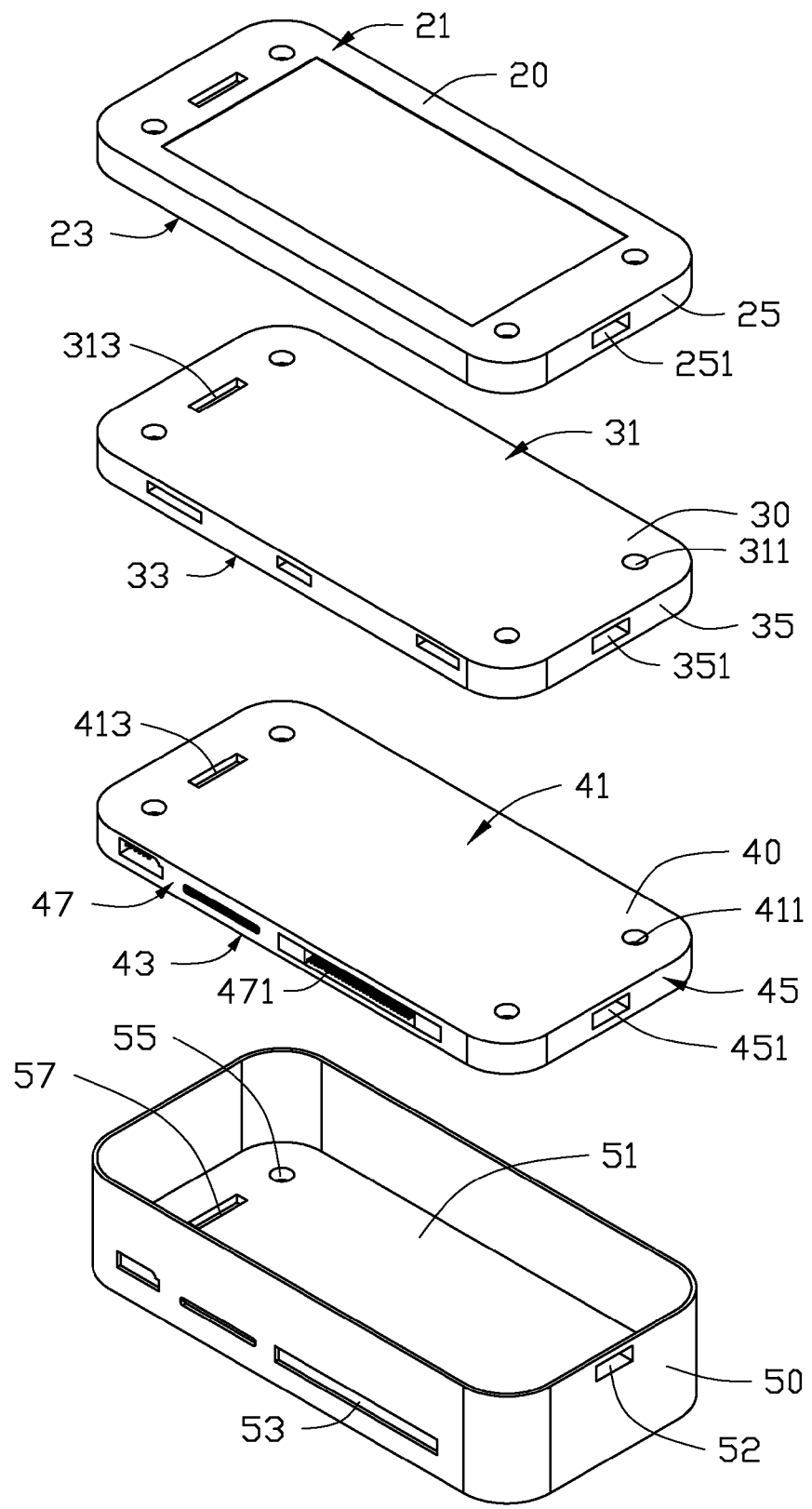
FIG. 2 is an exploded, isometric view of the electronic device of FIG. 1.

FIG. 2 illustrates an exploded view of the electronic device of FIG. 1. In at least one embodiment, an electronic device 100 includes a host module 20, a first expansion module 30, and a second expansion module 40. The host module 20 can be a minicomputer. The first expansion module 30 and the second expansion module 40 can be two extensible modules for the minicomputer. The host module 20 can include a plurality of functional components, such as connectors, a printed circuit board, a display module, which are not shown in the embodiment. The host module 20 can take photos and videos, download files, or browse the Internet.

Figure 3:
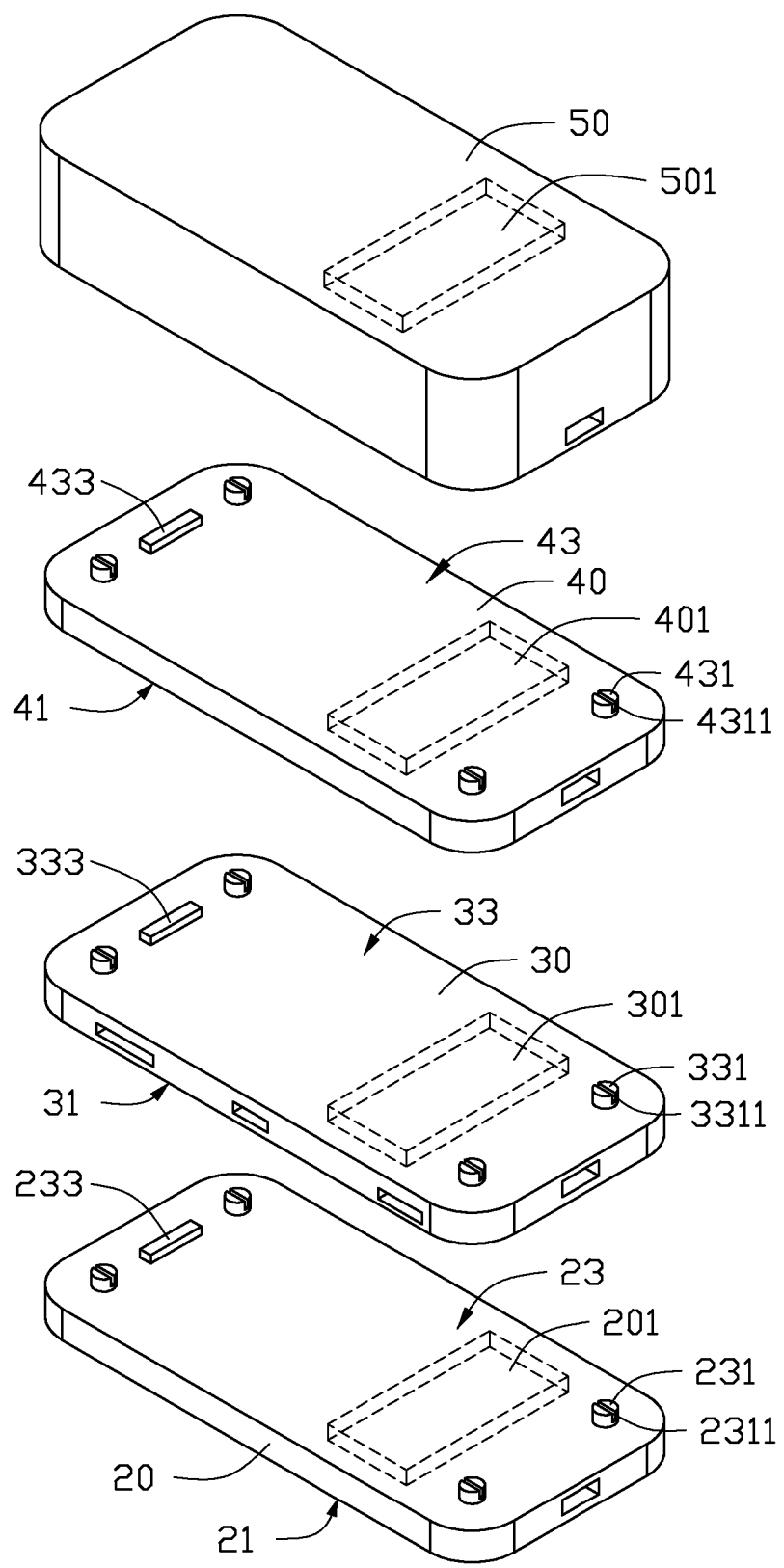
FIG. 3 is similar to FIG. 2, but shown from another angle.

FIG. 3 illustrates an exploded view of the electronic device of FIG. 2 from another angle. In at least one embodiment, the host module 20 can be a cuboid. The host module 20 can include a first wall 21 and a second wall 23 substantially parallel to the first wall 21. The host module 20 can include a screen 211 on the first wall 21. The screen 211 can display icons, words, or pictures. The host module 20 can include a plurality of host engaging portions 231 protruding from the second wall 23. The plurality of host engaging portions 231 can number four. Each host engaging portion 231 can be a cylinder. A distal end of each host engaging portion 231 can define a groove 2311. The host module 20 can also include a chargeable battery 201.

The host module 20 can also include a side wall 25. The side wall 25 is substantially perpendicular to the first wall 21 and the second wall 23. A charging port 251 is defined in the side wall 25 and is electrically coupled to the chargeable battery 201. The chargeable battery 201 can be charged by an external power supply through the charging port 251.

The first expansion module 30 and the second expansion module 40 can be a cuboid and can have the same size as each other and the host module 20. The first expansion module 30 can include a chargeable battery 301. The second expansion module 40 can include a chargeable battery 401. The first expansion module 30 can further include a data storage unit.

The first expansion module 30 can include a first coupling wall 31 and a first expansion wall 33 substantially parallel to the first coupling wall 31. The first coupling wall 31 defines a plurality of first receiving portions 311. The plurality of first receiving portions 311 can number the same as the plurality of host engaging portions 231. Each of the plurality of first receiving portions 311 can be a cylindrical hole. An inner diameter of each of the plurality of first receiving portions 311 can be slightly smaller than a diameter of the each host engaging portion 231. Each of the plurality of first receiving portions 311 can be engaged with the corresponding host engaging portion 231 to mount the host module 20 to the first expansion module 30. The first expansion module 30 can further define a first coupler 313 in the first coupling wall 31. The first coupler 313 is aligned with the host connector 233 of the host module 20. When the first coupler 313 is electrically coupled to the host connector 233, the first expansion module 30 can transmit data to the host module 20, and the data storage unit in first expansion module 30 is available by the host module 20. The chargeable battery 301 can also charge the chargeable battery 201.

The first expansion module 30 can include a plurality of first engaging portions 331 protruding form the first expansion wall 33. The plurality of first engaging portions 331 can number four. Each of the plurality of first engaging portions 331 can be a cylinder. Each of the plurality of first engaging portions 331 has the same configuration as each of the plurality of host engaging portions 231. A distal end of each of the plurality of first engaging portions 331 defines a groove 3311. The distal end of each of the plurality of first engaging portions 331 can be deformed when being used. A first connector 333 is located on the first expansion wall 33 of the first expansion module 30.

The first expansion module 30 can further include a side wall 35. The side wall 35 is substantially perpendicular to the first coupling wall 31 and the first expansion wall 33. The side wall 35 can defines a charging port 351 to electrically couple to the chargeable battery 301. The chargeable battery 301 can be charged by the external power supply through the charging port 351.

The second expansion module 40 has the same structural configuration to the first expansion module 30. The second expansion module 40 can include a second coupling wall 41 and a second expansion wall 43 substantially parallel to the second coupling wall 41. A plurality of second receiving portions 411 is defined in the second coupling wall 41. The plurality of second receiving portions 411 can number the same as the plurality of first engaging portions 331. Each of the plurality of second receiving portions 411 can be a cylindrical hole. An inner diameter of the each of the plurality of second receiving portions 411 can be slightly smaller than a diameter of the each first engaging portion 331. Each of the plurality of second receiving portions 411 can be engaged with the corresponding first engaging portion 331 to mount the second expansion module 40 to the first expansion module 30. The second expansion module 40 can further define a second coupler 413 in the second coupling wall 41. The second coupler 413 is aligned with the first connector 333 of the first expansion module 30. The chargeable battery 401 can also charge the chargeable battery 301.

The second expansion module 40 can include a plurality of second engaging portions 431 protruding from the second expansion wall 43. The plurality of second engaging portions 431 can number four. Each second engaging portion 431 can be a cylinder. Each second engaging portion 431 has the same structural configuration as each of the plurality of first engaging portions 331. A groove 4311 is defined in a distal end of each of the plurality of second engaging portions 431. The distal end of each of the plurality of first engaging portions 431 can be deformed when being used. A second connector 433 is located on the second expansion wall 43 of the second expansion module 40.

The second expansion module 40 can also include a side wall 45. The side wall 45 is substantially perpendicular to the second coupling wall 41 and the second expansion wall 43. The side wall 45 can define a charging port 451 to electrically couple to the chargeable battery 401. The chargeable battery 401 can be charged by the external power supply through the charging port 451.

The second expansion module 40 can further include a connecting wall 47. The connecting wall 47 is substantially perpendicular to the second coupling wall 41, the second expansion wall 43, and the side wall 45. A plurality of data ports 471 is defined in the connecting wall 47. The plurality of data ports 471 can include a universal serial bus (USB) port, a video graphics array (VGA) port, a high definition multimedia interface (HDMI) port, or a printer port. When the second coupler 413 is electrically coupled to the first connector 333, the second expansion module 40 can transmit data to the host module 20 through the first expansion module 30. The plurality of data ports 471 can expand input and output ports of the host module 20.

In at least one embodiment, the electronic device 100 can further include a housing 50. The host module 20, the first expansion module 30, and the second expansion module 40 can be received in the housing 50. A chargeable battery 501 can be located in the housing 50. The chargeable battery 501 can be charged through a wireless charging adapter.

The housing 50 can be a cuboid box. A receiving space 51 can be defined in the housing 50. A side wall of the housing 50 can define a plurality of slots 53 corresponding to the plurality of data ports 471. The plurality of data ports 471 can be plugged through the plurality of slots 53. The side wall of the housing 50 can define a through hole 52 corresponding to the charging port 251 of the host module 20. The housing 50 defines a plurality of housing receiving portions 55 in the second coupling wall 41. The plurality of housing receiving portions 55 can number the same as the plurality of second engaging portions 431. Each of the plurality of housing receiving portions 511 can be a cylindrical hole. An inner diameter of the each of the plurality of housing receiving portions 55 can be slightly smaller than a diameter of the each of the plurality of second engaging portions 431. Each of the plurality of housing receiving portions 55 can be engaged with the corresponding second engaging portion 431 to mount the second expansion module 40 to the housing 50. The housing 50 further defines a housing coupler 57. The housing coupler 57 is aligned with the second connector 433 of the second expansion module 40. The housing coupler 57 is electrically coupled to the chargeable battery 501.

When the housing coupler 57 is electrically coupled to the second connector 433, the chargeable battery 201 can be charged by the chargeable battery 301, the chargeable battery 401, or the chargeable battery 501.

Figure 4:
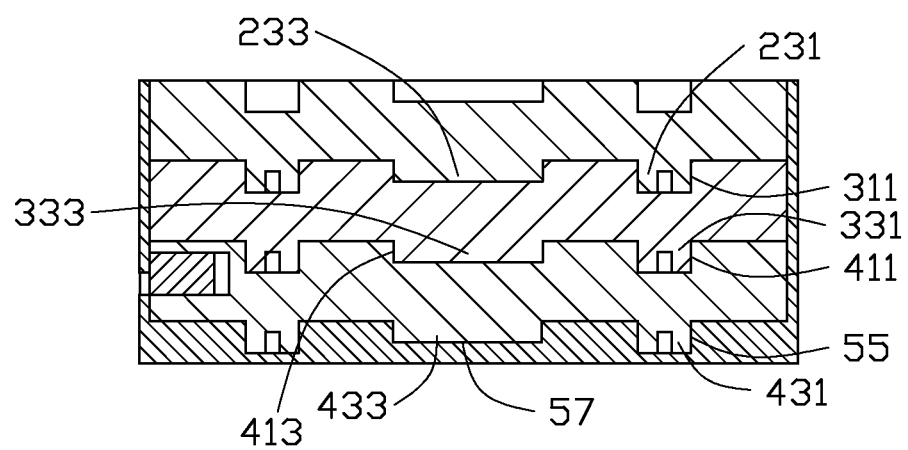
FIG. 4 is a cross sectional view of the electronic device along a line IV-IV of FIG. 1.

FIG. 4 illustrates a cross sectional view of the electronic device along the lines IV-IV of FIG. 1. In at least one embodiment, during assembly, the second expansion module 40 is positioned in the housing 50, and the plurality of data ports 471 is aligned with the plurality of slots 53. The plurality of second engaging portions 431 is engaged with the plurality of housing receiving portions 55. The second connector 433 of the second expansion module 40 is coupled to the housing coupler 57 of the housing 50. The first expansion module 30 is stacked on the second expansion module 40. The plurality of first engaging portions 331 is engaged with the plurality of second receiving portions 411. The first connector 333 of the first expansion module 30 is coupled to the second coupler 413. The host module 20 is stacked on the first expansion module 30. The plurality of host engaging portions 231 is engaged with the plurality of first receiving portions 311. The host connector 233 of the host module 20 is coupled to the first coupler 313. The charging port 251 is aligned with the through hole 52 of the housing 50.

In operation, the second expansion module 40, the first expansion module 30, and the host module 20 are positioned and stacked in the housing 50 in sequence. The second expansion module 40, the first expansion module 30, the host module 20 and the housing 50 are electrically coupled. Then, the host module 20 can exchange data from the first expansion module 30 to expand storage space of the host module 20. The plurality of data ports 471 can expand an input and output ability of the host module 20 to couple to external devices. When the battery 201 is lower, the batteries 301, 401, and 501 can charge the battery 201 through running a battery management application in the host module 20. The second expansion module 40, the first expansion module 30, and the housing 50 can be detached from the host module 20 when not in use.

In at least one embodiment, the second expansion module 40 can expand input and output ports of the host module 20. The first expansion module 30 can expand storage of the host module 20. The first expansion module 30 has the first coupler 313 to couple to the host connector 233 of the host module 20 when the host module 20 is stacked on the first expansion module 30. The first expansion module 30 is detachable with the host module 20 through the host engaging portion 231 and the first receiving portion 311. It is easy to detach the second expansion module 40, the first expansion module 30, and the housing 50 from the host module 20.

In at least one embodiment, when the storage in the electronic device 100 is low or the electronic device 100 is overheated, the first expansion module 30 or the second expansion module 40 can be configured to work as an outer storage or a heat sink. The batteries 301 and 401 can be omitted. The first expansion module 30 and the second expansion module 40 can stack on the host module 20 to expand system performance of the host module 20.

In other embodiments, the first expansion module 30 can be an audio player, an audio device, a heat sink, or an input and output device with a plurality of data ports.

In other embodiments, the plurality of expansion modules can number three or more. The plurality of expansion modules can be stacked on the host module. An sequence of the expansion modules can be alternative.

In other embodiments, an engaging manner or a coupling manner between the first expansion module and the second expansion module, or the first expansion module and the host module can be alternatively changed.

In other embodiments, the host engaging portions, the first engaging portions, and the second engaging portions can be configured to have variable numbers. The first receiving portions, the second receiving portions, and the housing receiving portions can also have corresponding numbers. The connectors and the couplers can number two or more.

In other embodiments, the host connector, the first connector, and the second connector can be retractable. The first coupler, the second coupler, and the housing coupler can extend to the coupling wall correspondingly.

In other embodiments, the battery in the housing and the housing coupler can be omitted.

In other embodiments, the housing can be omitted.

In other embodiments, the grooves in the host engaging portion, the first engaging portion, and the second engaging portion can be defined to cross.

In other embodiments, the charging ports in the host module, the first expansion module, and the second expansion module can be omitted. The host module, the first expansion module, and the second expansion module can be wirelessly charged through a wireless charging adapter.

The embodiments shown and described above are only examples. Many details are often found in the art such as the other features of a wireless charger and a wireless charging method. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. An electronic device, comprising:
a host module having a first wall and a second wall substantially parallel to the first wall;
a host connector located on the second wall;
a first expansion module comprising a first coupling wall and a first expansion wall substantially parallel to the first coupling wall;
a first coupler located on the first coupling wall; and
a housing;
wherein the first expansion module is configured to be stacked on the host module where the first coupling wall contacts the second wall, and the first coupler is electrically and detachably coupled to the host connector;
wherein the housing defines a housing coupler, a first connector is located on the first expansion wall of the first expansion module, the host module and the first expansion module are located in the housing, and the first connector is electrically and detachably coupled to the housing coupler.

2. The electronic device of claim 1, wherein a host engaging portion is located on the second wall of the host module, a first receiving portion is defined in the first coupling wall of the first expansion module, and the first receiving portion is detachably engaged with the host engaging portion.

3. The electronic device of claim 1, wherein a chargeable battery is located in the housing.

4. The electronic device of claim 3, wherein a first engaging portion is located on the first expansion wall of the first expansion module, a housing receiving portion is defined in the housing, and the first engaging portion is detachably engaged with the housing receiving portion.

5. The electronic device of claim 1, further comprising a second expansion module, wherein the second expansion module comprises a second coupling wall and a second expansion wall substantially parallel to the second coupling wall, a second coupler is located on the second coupling wall; the first expansion module comprises a first connector located on the first coupling wall; the second expansion module is configured to be stacked on the first expansion module where the second coupling wall contacts the first expansion wall, and the second coupler is electrically and detachably coupled to the first connector.

6. The electronic device of claim 5, wherein a first engaging portion is located on the first expansion wall of the first expansion module, a second receiving portion is defined in the second coupling wall of the second expansion module, and the second receiving portion is detachably engaged with the first engaging portion.

7. The electronic device of claim 5, wherein at least one of the first expansion module and second expansion module comprises a chargeable battery.

8. The electronic device of claim 5, further comprising a housing, wherein a chargeable battery is located in the housing, the housing defines a housing coupler, a second connector is located on the second expansion wall of the second expansion module; the host module, the first expansion module and the second expansion module are located in the housing, and the second connector is electrically and detachably coupled to the housing coupler.

9. The electronic device of claim 8, wherein at least one of the first expansion module and the second expansion module defines a plurality of data ports on a lateral side, and the housing defines a plurality of slots corresponding to the plurality of data ports.

10. The electronic device of claim 1, wherein the first expansion module has the same size to the host module.

11. An electronic device, comprising:
a host module having a first wall and a second wall substantially parallel to the first wall, a host connector located on the second wall;
a first expansion module comprising a first coupling wall and a first expansion wall substantially parallel to the first coupling wall, a first coupler located on the first coupling wall;
a second expansion module comprising a second coupling wall and a second expansion wall substantially parallel to the second coupling wall, a second coupler located on the second coupling wall; and
a housing;
wherein the first expansion module is configured to be stacked on the host module where the first coupling wall contacts the second wall, and the first coupler is electrically and detachably coupled to the host connector,
wherein the second expansion module is configured to be stacked on the host module where the second coupling wall contacts the second wall, and the second coupler is electrically and detachably coupled to the host connector,
wherein the second expansion module is configured to be stacked on the first expansion module where the second coupling wall contacts the first expansion wall, and the second coupler is electrically and detachably coupled to the first connector;
wherein the host module, the first expansion module, and the second expansion module are received in the housing.

12. The electronic device of claim 11, wherein a host engaging portion is located on the second wall of the host module, a first receiving portion is defined in the first coupling wall of the first expansion module, and the first receiving portion is detachably engaged with the host engaging portion.

13. The electronic device of claim 11, further comprising a housing, wherein a chargeable battery is located in the housing.

14. The electronic device of claim 13, wherein the housing defines a housing coupler, a first connector is located on the first expansion wall of the first expansion module, and the first connector is configured to be electrically and detachably coupled to the housing coupler.

15. The electronic device of claim 13, wherein a first engaging portion is located on the first expansion wall of the first expansion module, a housing receiving portion is defined in the housing, and the first engaging portion is configured to be detachably engaged with the housing receiving portion.

16. The electronic device of claim 13, wherein the housing defines a housing coupler, a second connector is located on the second expansion wall of the second expansion module, and the second connector is configured to be electrically and detachably coupled to the housing coupler.

17. The electronic device of claim 13, wherein a second engaging portion is located on the second expansion wall of the second expansion module, a housing receiving portion is defined in the housing, and the second engaging portion is configured to be detachably engaged with the housing receiving portion.

18. The electronic device of claim 13, wherein at least one of the first expansion module and the second expansion module defines a plurality of data ports on a lateral side, and the housing defines a plurality of slots corresponding to the plurality of data ports.

19. The electronic device of claim 11, wherein each of the host module, the first expansion module, and the second expansion module comprises a chargeable battery.

20. The electronic device of claim 11, wherein the host module, the first expansion module, and the second expansion module have the same size.

* * * * *